(12) United States Patent
Tang

(10) Patent No.: US 10,394,088 B2
(45) Date of Patent: Aug. 27, 2019

(54) LIQUID CRYSTAL DISPLAY PANEL AND LIQUID CRYSTAL DISPLAY DEVICE

(71) Applicant: Shenzhen China Star Optoelectronics Technology Co., Ltd., Shenzhen, Guangdong (CN)

(72) Inventor: Yuejun Tang, Guangdong (CN)

(73) Assignee: Shenzhen China Star Optoelectronics Technology Co., Ltd, Shenzhen (CN)

( * ) Notice: Subject to any disclaimer, the term of this patent is extended or adjusted under 35 U.S.C. 154(b) by 173 days.

(21) Appl. No.: 14/443,632

(22) PCT Filed: Mar. 3, 2015

(86) PCT No.: PCT/CN2015/073579
§ 371 (c)(1),
(2) Date: May 18, 2015

(87) PCT Pub. No.: WO2016/123827
PCT Pub. Date: Aug. 11, 2016

(65) Prior Publication Data
US 2016/0370627 A1    Dec. 22, 2016

(30) Foreign Application Priority Data

Feb. 5, 2015 (CN) .......................... 2015 1 0060645

(51) Int. Cl.
*G02F 1/1339* (2006.01)
(52) U.S. Cl.
CPC ........ *G02F 1/13394* (2013.01); *G02F 1/1339* (2013.01); *G02F 2001/13396* (2013.01)

(58) Field of Classification Search
CPC .. G02F 1/1339; G02F 1/0107; G02F 1/13394; G02F 2001/13396; H01J 11/36
See application file for complete search history.

(56) References Cited

U.S. PATENT DOCUMENTS

2007/0002265 A1* 1/2007 Kwak ................. G02F 1/13392
349/156
2011/0222014 A1* 9/2011 Kim .................... G02F 1/13394
349/155

(Continued)

FOREIGN PATENT DOCUMENTS

CN           1892382 A      1/2007
CN         101216641 A      7/2008

(Continued)

*Primary Examiner* — Paisley L Arendt
*Assistant Examiner* — Mariam Qureshi
(74) *Attorney, Agent, or Firm* — Andrew C. Cheng

(57) ABSTRACT

Provided are a liquid crystal display panel and a liquid crystal display device. The liquid crystal display panel includes a first substrate and a second substrate opposite to each other. The first substrate has a first surface and a second surface opposite to each other. The second substrate includes a third surface and a fourth surface opposite to each other. The third surface is arranged adjacent to the first surface. The first substrate includes a main photo spacer, a first sub photo spacer, and a second sub photo spacer formed thereon. The main photo spacer, the first sub photo spacer, and the second sub photo spacer have ends that are adjacent to the third surface and are spaced from the third surface by different distances. The liquid crystal display panel has an enhanced displaying quality.

8 Claims, 3 Drawing Sheets

(56) References Cited

U.S. PATENT DOCUMENTS

2013/0057820 A1* 3/2013 Hyodo .................. G02F 1/1337
349/155
2014/0198284 A1* 7/2014 Weng ................ G02F 1/133371
349/106

FOREIGN PATENT DOCUMENTS

| CN | 102193251 A | 9/2011 |
| CN | 102213857 A | 10/2011 |
| JP | 2002341354 A | 11/2002 |

* cited by examiner

LIQUID CRYSTAL DISPLAY PANEL AND LIQUID CRYSTAL DISPLAY DEVICE

CROSS REFERENCE TO RELATED APPLICATIONS

This application claims the priority of Chinese Patent Application No. 201510060645.9, entitled "Liquid Crystal Display Panel and Liquid Crystal Display Device", filed on Feb. 5, 2015, the disclosure of which is incorporated herein by reference in its entirety.

BACKGROUND OF THE INVENTION

1. Field of the Invention

The present invention relates to the field of flat panel display technology, and in particular to a liquid crystal display panel and a liquid crystal display device.

2. The Related Arts

Liquid crystal displays (LCDs) are a commonly used electronic device and is generally favored by consumers due to various advantages including low power consumption, small size, and light weight. Currently, the majority of the liquid crystal displays is thin-film transistor liquid crystal displays (TFT-LCDs). The TFT-LCD generally comprises a TFT array substrate, a color filter (CF) substrate, and a layer of liquid crystal interposed between the TFT array substrate and the CF substrate. To maintain a constant cell gap of the TFT-LCD, a number of photo spacers (PSs) are provided in the interior of the TFT-LCD. Specifically, the photo spacers are arranged between the TFT array substrate and the CF substrate to support the TFT array substrate and the CF substrate in order to maintain a constant cell gap of the TFT-LCD. The photo spacers used are generally of an arrangement of two sections of photo spacers. The two sections of the spacers are respectively referred to as "main photo spacers" and "sub photo spacers". The main photo spacers are arranged with a low density and have a large height. After assembly of the panel, the main photo spacers are supported between the TFT array substrate and the CF substrate. The main photo spacers may be subjected to different amounts of compression, within a predetermined range, with the different amounts of liquid crystal used. The sub photo spacers are arranged with a high density and have a small height. When the liquid crystal display is depressed, the sub photo spacers provide a function of supporting the TFT array substrate and the CF substrate. However, the two-sectioned arrangement of photo spacers may result in a large amount of deformation of the main photo spacers when they are depressed, and would readily lead to damage; while the sub photo spacers are subjected to a relatively small amount of elastic deformation, so that the TFT-LCD may have weak resistance against dynamic pressure. Under this circumference, damages of the TFT array substrate or the CF substrate may readily occur, leading to deteriorated quality of the TFT-LCD.

SUMMARY OF THE INVENTION

In one aspect, the present invention provides a liquid crystal display panel, which improves the quality of the liquid crystal display panel.

The liquid crystal display panel comprises a first substrate and a second substrate that are opposite to each other. The first substrate comprises a first surface and a second surface that are opposite to each other. The second substrate comprises a third surface and a fourth surface that are opposite to each other. The third surface is adjacent to the first surface. The first surface of the first substrate comprises a main photo spacer, a first sub photo spacer, and a second sub photo spacer formed thereon. The main photo spacer, the first sub photo spacer, and the second sub photo spacer have ends that are adjacent to the third surface and are spaced from the third surface by different distances.

In the above liquid crystal display panel, the third surface of the second substrate comprise a first accommodation section formed thereon and the first accommodation section is arranged to correspond to the first sub photo spacer.

In the above liquid crystal display panel, the liquid crystal display panel further comprises a second accommodation section formed on the third surface of the second substrate. The second accommodation is being arranged to correspond to the second sub photo spacer. The second accommodation section has a depth that is smaller than a depth of the first accommodation section.

In the above liquid crystal display panel, the first accommodation section and the second accommodation section are formed through half tone mask processing.

In the above liquid crystal display panel, the first sub photo spacer comprises a first end mounted to the first surface and a second end opposite to the first end and the first end has a width that is greater than a width of the second end; the second sub photo spacer comprises a third end mounted to the first surface and a fourth end opposite to the third end and the third end has a width greater than a width of the fourth end; and the first accommodation section has a width that is smaller than the width of the first end and greater than the width of the second end and the second accommodation section has a width that is smaller than the width of the third end and greater than the width of the fourth end.

In the above liquid crystal display panel, the main photo spacer, the first sub photo spacer, and the second sub photo spacer have heights that are identical.

In the above liquid crystal display panel, the main photo spacer has a height that is greater than a height of the first sub photo spacer and a height of the second sub photo spacer and the height of the first sub photo spacer is equal to the height of the second sub photo spacer.

In the above liquid crystal display panel, the main photo spacer has a height that is greater than a height of the first sub photo spacer and the height of the first sub photo spacer is greater than a height of the second sub photo spacer.

In the above liquid crystal display panel, the main photo spacer, the first sub photo spacer, and the second sub photo spacer are each multiple in number and the number of the first sub photo spacer is greater than the number of the second sub photo spacer and the number of the second sub photo spacer is greater than the number of the main photo spacer.

In a different aspect, the present invention provides a liquid crystal display device. The liquid crystal display device comprises a liquid crystal display panel described previously.

Compared to the known art, the present invention provides a liquid crystal display panel and a liquid crystal display device comprising the liquid crystal display panel, in which a first surface of a first substrate comprises a main photo spacer, a first sub photo spacer, and a second sub photo spacer formed thereon. Correspondingly, a first accommodation section is formed on a third surface of a second substrate and the first accommodation section corresponds to the first photo spacer. And, ends of the main photo spacer, the first sub photo spacer, and the second sub photo spacer that are adjacent to the third surface are spaced from the third surface by different distances. When vibration or compression occurs on the liquid crystal display panel, since the first sub photo spacer and the second sub photo spacer may help share the force applied to the main photo spacer at the time when the liquid crystal display panel is subjected to different amounts or levels of compression, damages of the liquid crystal display panel caused by the vibration or compression can be effectively avoided and bettered resistance against dynamic pressures can be achieved. Thus, the liquid crystal display panel according to the present invention shows an enhanced displaying quality and bettered resistance against dynamic pressures.

BRIEF DESCRIPTION OF THE DRAWINGS

To more clearly explain the technical solutions proposed in embodiments of the present invention or those of the prior art, a brief description of the drawings that are necessary for describing the embodiments of the present invention or those of the prior art is given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to technical solutions of the embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Figure 1:
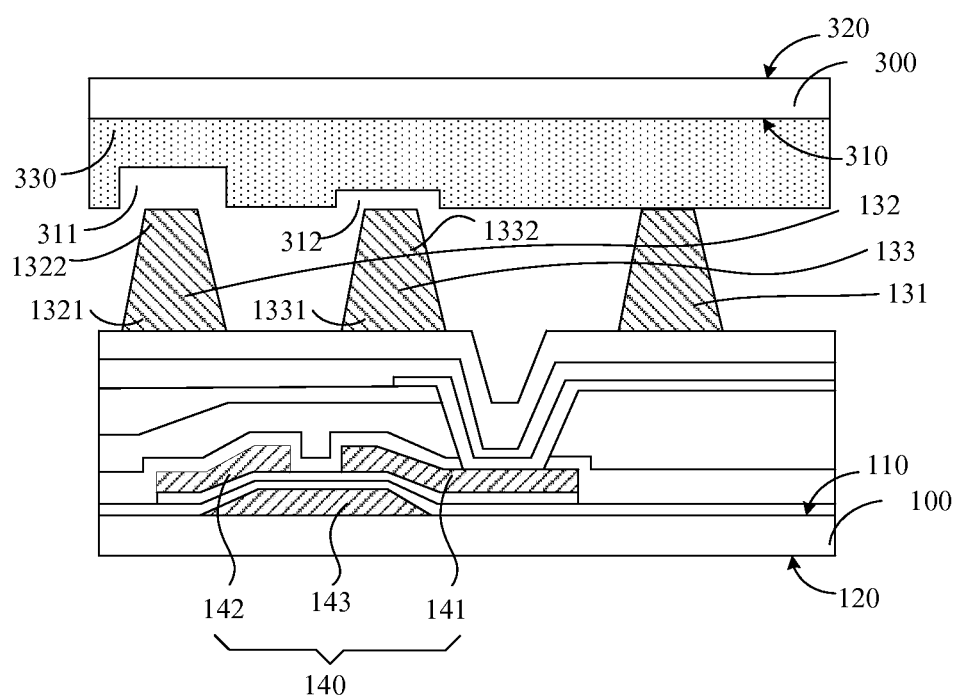
FIG. 1 is a cross-sectional view showing a liquid crystal display panel according to a first preferred embodiment of the present invention.

Referring to FIG. 1, FIG. 1 is a cross-sectional view showing a liquid crystal display panel according to a first preferred embodiment of the present invention. The liquid crystal display panel 10 comprises a first substrate 100 and a second substrate 300 that are opposite to each other. The first substrate 100 comprises a first surface 110 and a second surface 120 that are opposite to each other; the second substrate 300 comprises a third surface 310 and a fourth surface 320 that are opposite to each other, the third surface 310 being arranged adjacent to the first surface 110. The first substrate 100 is provided, mounted thereon, a main photo spacer 131, a first sub photo spacer 132, and a second sub photo spacer 133, and the main photo spacer 131, the first sub photo spacer 132, and the second sub photo spacer 133 are spaced from each other. The third surface 310 of the second substrate 300 is provided with a first accommodation section 311 formed therein and the first accommodation section 311 corresponds to the first sub photo spacer 132. The main photo spacer 131, the first sub photo spacer 132, and the second sub photo spacer 133 have ends that are adjacent to the third surface 310 and are spaced from the third surface 310 by different distance. The first substrate 100 and the second substrate 300 can respectively be a thin-film transistor array substrate and a color filter substrate; or alternatively, the first substrate 100 and the second substrate 300 can respectively be a color filter substrate and a thin-film transistor array substrate. In the instant embodiment, the main photo spacer 131, the first sub photo spacer 132 and the second sub photo spacer 133 are each provided in multiplicity and are of different numbers. Specifically, the number of the main photo spacer 131 is the smallest and the number of the first sub photo spacer 132 is the greatest. Preferably, the main photo spacer 131, the first sub photo spacer 132, and the second sub photo spacer 133 are arranged to have a regular distance therebetween on the first substrate 100.

The liquid crystal display panel 10 according to the first embodiment of the present invention further comprises a second accommodation section 312 provided on the third surface 310 of the second substrate 300. The second accommodation section 312 is arranged to correspond to the second sub photo spacer 133 and the second accommodation section 312 has a depth that is smaller than a depth of the first accommodation section 311 so that the main photo spacer 131, the first sub photo spacer 132, and the second sub photo spacer 133 are spaced from the third surface 310 by different distances. Preferably, the first accommodation section 311 and the second accommodation section 312 are formed by applying half tone mask based processing. The first accommodation section 311 and the second accommodation section 312 are formed at the same time by applying half tone mask processing in order to save an operation form making the first accommodation section 311 and the second accommodation section 312.

The first sub photo spacer 132 comprises a first end 1321 mounted to the first surface 110 and a second end 1322 opposite to the first end 1321. The first end 1321 has a width greater than a width of the second end 1322. The second sub photo spacer 133 comprises a third end 1331 mounted to the first surface 110 and a fourth end 1332 opposite to the third end 1311. The third end 1331 has a width greater than a width of the fourth end 1332. The first accommodation section 311 has a width that is smaller than the width of the first end 1321 and greater than the width of the second end 1322. The second accommodation section 312 has a width smaller than the width of the third end 1331 and greater than the width of the fourth end 1332. When vibration or compression occurs between the first substrate 100 and the second substrate 300, the first sub photo spacer 132 is receivable into the first accommodation section 311 and the second sub photo spacer 133 is receivable into the second accommodation section 312. Since the width of the first accommodation section 311 is smaller than the width of the first end 1321 and greater than the width of the second end 1322 and since the width of the second accommodation section 312 is smaller than the width of the third end 1331 and greater than the width of the fourth end 1332, the first sub photo spacer 132 and the second sub photo spacer 133 can be respectively held in the first accommodation section 311 and the second accommodation section 312 so that positional deviation of the liquid crystal display panel 10 can be limited to a small amount. In the instant embodiment, the first accommodation section 311 and the second accommodation section 312 are each a recessed groove and the height of the main photo spacer 131, the height of the first sub photo spacer 132, and the height of the second sub photo spacer 133 are identical. When the liquid crystal display panel 10 is depressed, the main photo spacer 131 first holds the first substrate 100 and the second substrate 300 in position; when the liquid crystal display panel 10 is further depressed, the second sub photo spacer 133 is received into the second accommodation section 312 to hold the first substrate 100 and the second substrate 300 in position; and when the liquid crystal display panel 10 is yet further depressed, the first sub photo spacer 132 is then received into the first accommodation section 311 to hold the first substrate 100 and the second substrate 300 in position. Obviously, the present invention makes use of the arrangement of the main photo spacer 131, the first sub photo spacer 132, and the second sub photo spacer 133 to allow, at the time when the liquid crystal display panel 10 is subjected to vibration or compression, the pressure applied to the main photo spacer 131 by different amounts of compression incurring in the liquid crystal display panel 10 to be shared by the first sub photo spacer 132 and the second sub photo spacer 133, thereby effectively preventing damage of the liquid crystal display panel 10 during vibration or compression and thus achieving improved resistance against dynamic pressures. Thus, the liquid crystal display panel 10 according to the present invention shows an enhanced displaying quality and bettered resistance against dynamic pressures.

The second substrate 300 comprises a covering layer 330. The covering layer 330 is formed on the third surface 310 of the second substrate 300 and the first accommodation section 311 and the second accommodation section 312 are formed on the covering layer 330. The covering layer 330 can be a planarization layer or a black matrix (BM) layer.

Compared to the known art, the present invention provides a liquid crystal display panel 10 in which a first surface 110 of a first substrate 100 comprises a main photo spacer 131, a first sub photo spacer 132, and a second sub photo spacer 133 formed thereon. Correspondingly, a first accommodation section 311 is formed on a third surface 310 of a second substrate 300 and the first accommodation section 311 corresponds to the first photo spacer 132. And, ends of the main photo spacer 131, the first sub photo spacer 132, and the second sub photo spacer 133 that are adjacent to the third surface 410 are spaced from the third surface 410 by different distances. When vibration or compression occurs on the liquid crystal display panel 10, since the first sub photo spacer 132 and the second sub photo spacer 133 may help share the force applied to the main photo spacer 131 at the time when the liquid crystal display panel 10 is subjected to different amounts or levels of compression, damages of the liquid crystal display panel 10 caused by the vibration or compression can be effectively avoided and bettered resistance against dynamic pressures can be achieved. Thus, the liquid crystal display panel 10 according to the present invention shows an enhanced displaying quality and bettered resistance against dynamic pressures.

Figure 2:
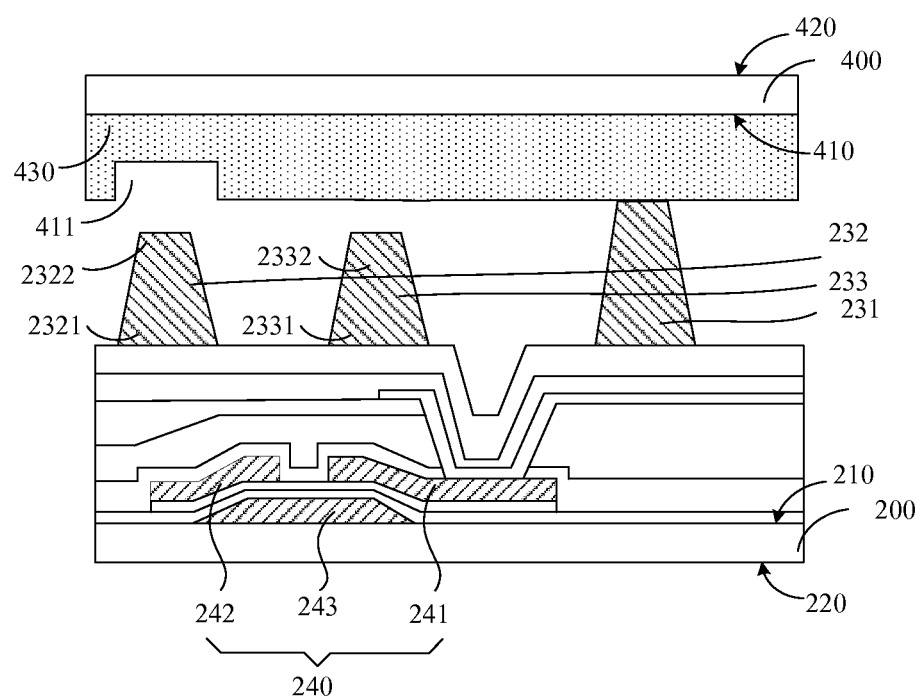
FIG. 2 is a cross-sectional view showing a liquid crystal display panel according to a second preferred embodiment of the present invention.

Referring to FIG. 2, FIG. 2 is a cross-sectional view showing a liquid crystal display panel according to a second embodiment of the present invention. The liquid crystal display panel 20 comprises a first substrate 200 and a second substrate 400 that are opposite to each other. The first substrate 200 comprises a first surface 210 and a second surface 220 that are opposite to each other; the second substrate 400 comprises a third surface 410 and a fourth surface 420 that are opposite to each other, the third surface 410 being arranged adjacent to the first surface 210. The first substrate 200 is provided, mounted thereon, a main photo spacer 231, a first sub photo spacer 232, and a second sub photo spacer 233. The third surface 410 of the second substrate 400 is provided with a first accommodation section 411 and the first accommodation section 411 corresponds to the first sub photo spacer 232. The main photo spacer 231, the first sub photo spacer 232, and the second sub photo spacer 233 are spaced from the third surface 410 by different distances. The first substrate 200 and the second substrate 400 can respectively be a thin-film transistor array substrate and a color filter substrate; or alternatively, the first substrate 200 and the second substrate 400 can respectively be a color filter substrate and a thin-film transistor array substrate. In the instant embodiment, the main photo spacer 231, the first sub photo spacer 232, and the second sub photo spacer 233 are each multiple in number and the numbers are different. Specifically, the number of the main photo spacer 231 is the smallest and the number of the first sub photo spacer 232 is the greatest.

Illustration of FIGS. 1 and 2 is based on a COA (CF on array) substrate. The COA substrate is one that a color resist layer (also referred to as a color filter layer) is formed on the TFT array side. Correspondingly, the substrate that is opposite to the COA substrate is provided with a planarization layer or a black matrix (BM).

In the instant embodiment, the height of the main photo spacer 231 is the greatest; the height of the first sub photo spacer 232 is equal to the height of the second sub photo spacer 233 and the height of the first sub photo spacer 232 and the height of the second sub photo spacer 233 are less than the height of the main photo spacers 231. In the instant embodiment, the main photo spacer 231, the first sub photo spacer 232, and the second sub photo spacer 233 are formed by applying half tone mask processing.

The first sub photo spacer 232 comprises a first end 2321 mounted to the first surface 210 and a second end 2322 opposite to the first end 2321. The first end 2321 has a width greater than a width of the second end 2322. The first accommodation section 411 has a width smaller than the width of the first end 2321 and greater than the width of the second end 2322. When vibration or compression occurs between the first substrate 200 and the second substrate 400, the first sub photo spacer 232 is receivable into the first accommodation section 411. Since the width of the first accommodation section 411 is smaller than the width of the first end 2321 and greater than the width of the second end 2322, the first sub photo spacer 232 can be held in the first accommodation section 311 so that positional deviation of the liquid crystal display panel 20 can be limited to a small amount. In the instant embodiment, the first accommodation section 411 comprises a recessed groove. The main photo spacer 231 is the first one that holds the first substrate 200 and the second substrate 400 in position; when the liquid crystal display panel 20 is depressed, the second sub photo spacer 233 holds the first substrate 200 and the second substrate 400 in position; and when the liquid crystal display panel 20 is further depressed, the first sub photo spacer 232 is received into the first accommodation section 411 to hold the first substrate 200 and the second substrate 400. Obviously, the present invention makes use of the arrangement of the main photo spacer 231, the first sub photo spacer 232, and the second sub photo spacer 233 to allow, at the time when the liquid crystal display panel 20 is subjected to vibration or compression, the pressure applied to the main photo spacer 231 by different amounts of compression incurring in the liquid crystal display panel 20 to be shared by the first sub photo spacer 232 and the second sub photo spacer 233, thereby effectively preventing damage of the liquid crystal display panel 20 during vibration or compression and thus achieving improved resistance against dynamic pressures. Thus, the liquid crystal display panel 20 according to the present invention shows an enhanced displaying quality and bettered resistance against dynamic pressures. Further, according to the present invention, the main photo spacer 231 is made of a material of high elasticity and restorability so that the height of the main photo spacers 231 may follow the amount of liquid crystal within the liquid crystal display panel 20 to change the amount of compression of the main photo spacer 231. Thus, the arrangement of the main photo spacer 231 according to the present invention may help expand the range of the amount of liquid crystal filled in the liquid crystal display panel 20.

The second substrate 400 comprises a covering layer 430. The covering layer 430 is formed on the third surface 410 of the second substrate 400 and the first accommodation section 411 is formed on the covering layer 430.

In an alternative embodiment, the height of the main photo spacer is greater than the height of the first sub photo spacer and the height of the first sub photo spacer is greater than the height of the second sub photo spacer so that the ends of the main photo spacer, the first sub photo spacer, and the second sub photo spacer that are adjacent to the third surface are spaced from the third surface by different distances in order to achieve improved resistance of the liquid crystal display panel 20 against dynamic pressures.

Compared to the known art, the present invention provides a liquid crystal display panel 20 in which a first surface 210 of a first substrate 200 comprises a main photo spacer 231, a first sub photo spacer 232, and a second sub photo spacer 233 formed thereon. Correspondingly, a first accommodation section 411 is formed on a third surface 410 of a second substrate 400 and the first accommodation section 411 corresponds to the first photo spacer 23. And, ends of the main photo spacer 231, the first sub photo spacer 232, and the second sub photo spacer 133 that are adjacent to the third surface 410 are spaced from the third surface 410 by different distances. When vibration or compression occurs on the liquid crystal display panel 20, since the first sub photo spacer 232 and the second sub photo spacer 233 may help share the force applied to the main photo spacer 231 at the time when the liquid crystal display panel 20 is subjected to different amounts or levels of compression, damages of the liquid crystal display panel 20 caused by the vibration or compression can be effectively avoided and bettered resistance against dynamic pressures can be achieved. Thus, the liquid crystal display panel 20 according to the present invention shows an enhanced displaying quality and bettered resistance against dynamic pressures.

Figure 3:
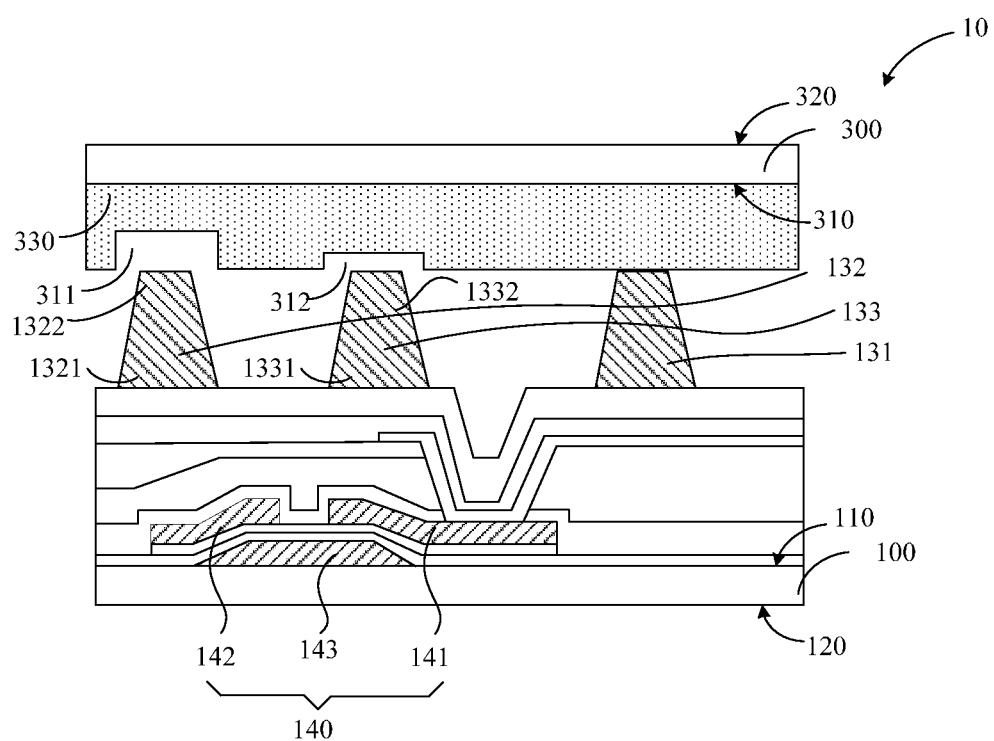
FIG. 3 is a cross-sectional view showing a liquid crystal display device according to a preferred embodiment of the present invention.
Figure 3:

Also referring to FIG. 3, FIG. 3 is a cross-sectional view showing a liquid crystal display device according to a preferred embodiment of the present invention. The liquid crystal display device 1 comprises a backlight module 30 and the liquid crystal display panel 10 illustrated in FIG. 1. The backlight module 30 is arranged opposite to the liquid crystal display panel 10. The backlight module 30 provides a planar light source to the liquid crystal display panel 10. The liquid crystal display panel 10 may have a structure of which details may be referred to the description given previously with respect to the liquid crystal display panel 10 and repeated illustration will be omitted here. It is appreciated that in other embodiments, the liquid crystal display device 1 may comprise a backlight module 30 and the liquid crystal display panel 20 illustrated in FIG. 2 in such a way that the backlight module 30 is opposite to the liquid crystal display panel 20 and the backlight module 30 provides a planar light source to the liquid crystal display panel 20. The liquid crystal display panel 20 may have a structure of which details may be referred to the description given previously with respect to the liquid crystal display panel 20 and repeated illustration will be omitted here.

The above illustrates only a preferred embodiment according to the present invention and is not intended to limit the scope of right of the present invention. Those having ordinary skills of the art would appreciate that various equivalent modifications that achieve all or some of the operations of the above-described embodiment and fall within scope of the attached claims are considered within the scope covered by the present invention.

What is claimed is:

1. A liquid crystal display panel, comprising a first substrate and a second substrate that are opposite to each other, the first substrate comprising a first surface and a second surface that are opposite to each other, the second substrate comprising a third surface and a fourth surface that are opposite to each other, the third surface being adjacent to the first surface, the first surface of the first substrate comprising a main photo spacer, a first sub photo spacer, and a second sub photo spacer formed thereon, wherein the main photo spacer, the first sub photo spacer, and the second sub photo spacer having ends that are adjacent to the third surface and are spaced from the third surface by different distances;

wherein the main photo spacer, the first sub photo spacer, and the second sub photo spacer have heights that are identical so that the ends of the main photo spacer, the first sub photo spacer, and the second sub photo spacer are spaced from a flat plane that is substantially parallel with the third surface by a predetermined distance that is identical to each of the main photo spacer, the first sub photo spacer, and the second sub photo spacer;

wherein the third surface of the second substrate comprises a first accommodation section and a second accommodation section respectively corresponding to the first sub photo spacer and the second sub photo spacer, wherein the first accommodation section comprises a first recessed groove formed on the third surface and the second accommodation section comprises a second recessed groove formed on the third surface, each of the first and second recessed grooves being formed by recessing the flat plane such that the first and second recessed grooves have bottoms recessed from the flat plane by a first depth and a second depth respectively, the first depth and the second depth being not zero depths, the first depth being different from the second depth, such that a first distance between the end of main photo spacer and the flat plane, a second distance between the end of the first sub photo spacer and the bottom of the first recessed groove, which is a combination of the first distance and the first depth, and a third distance between the end of the second sub photo spacer and the bottom of the second recessed groove, which is a combination of the first distance and the second depth, are different from each other, and the second distance and the third distance are both greater than the first distance;

wherein the first and second depths of the bottoms of the first and second recessed grooves are different and the first and second sub photo spacers have identical heights so that the second distance between the first sub photo spacer and the bottom of the first recessed groove is greater than the third distance between the second sub photo spacer and the bottom of the second recessed groove, wherein the first distance is of a smallest value among the first, second, and third distances, and the second distance is of a greatest value among the first, second, and third distances; and wherein the main photo spacer, the first sub photo spacer, and the second sub photo spacer are each multiple in number and the number of the first sub photo spacer is greater than the number of the second sub photo spacer and the number of the second sub photo spacer is greater than the number of the main photo spacer, such that the number of the main photo spacer of which the first distance is of a smallest value among the first, second, and third distances is smaller than the number of second sub photo spacer, which is in turn smaller than the number of the first sub photo spacer of which the second distance is of a greatest value among the first, second, and third distances.

2. The liquid crystal display panel as claimed in claim 1, wherein the second depth of the second accommodation section is smaller than the first depth of the first accommodation section.

3. The liquid crystal display panel as claimed in claim 1, wherein the first accommodation section and the second accommodation section are formed through half tone mask processing.

4. The liquid crystal display panel as claimed in claim 1, wherein the first sub photo spacer comprises a first end mounted to the first surface and a second end opposite to the first end, the first end having a width that is greater than a width of the second end; the second sub photo spacer comprises a third end mounted to the first surface and a fourth end opposite to the third end, the third end having a width greater than a width of the fourth end; and the first accommodation section has a width that is smaller than the width of the first end and greater than the width of the second end and the second accommodation section has a width that is smaller than the width of the third end and greater than the width of the fourth end.

5. A liquid crystal display device, comprising a liquid crystal display panel, the liquid crystal display panel comprising a first substrate and a second substrate that are opposite to each other, the first substrate comprising a first surface and a second surface that are opposite to each other, the second substrate comprising a third surface and a fourth surface that are opposite to each other, the third surface being adjacent to the first surface, the first surface of the first substrate comprising a main photo spacer, a first sub photo spacer, and a second sub photo spacer formed thereon, wherein the main photo spacer, the first sub photo spacer, and the second sub photo spacer having ends that are adjacent to the third surface and are spaced from the third surface by different distances;

wherein the main photo spacer, the first sub photo spacer, and the second sub photo spacer have heights that are identical so that the ends of the main photo spacer, the first sub photo spacer, and the second sub photo spacer are spaced from a flat plane that is substantially parallel with the third surface by a predetermined distance that is identical to each of the main photo spacer, the first sub photo spacer, and the second sub photo spacer;

wherein the third surface of the second substrate comprises a first accommodation section and a second accommodation section respectively corresponding to the first sub photo spacer and the second sub photo spacer, wherein the first accommodation section comprises a first recessed groove formed on the third surface and the second accommodation section comprises a second recessed groove formed on the third surface, each of the first and second recessed grooves being formed by recessing the flat plane such that the first and second recessed grooves have bottoms recessed from the flat plane by a first depth and a second depth respectively, the first depth and the second depth being not zero depths, the first depth being different from the second depth, such that a first distance between the end of main photo spacer and the flat plane, a second distance between the end of the first sub photo spacer and the bottom of the first recessed groove, which is a combination of the first distance and the first depth, and a third distance between the end of the second sub photo spacer and the bottom of the second recessed groove, which is a combination of the first distance and the second depth, are different from each other, and the second distance and the third distance are both greater than the first distance;

wherein the first and second depths of the bottoms of the first and second recessed grooves are different and the first and second sub photo spacers have identical heights so that the second distance between the first sub photo spacer and the bottom of the first recessed groove is greater than the third distance between the second sub photo spacer and the bottom of the second recessed groove, wherein the first distance is of a smallest value among the first, second, and third distances, and the second distance is of a greatest value among the first, second, and third distances; and wherein the main photo spacer, the first sub photo spacer, and the second sub photo spacer are each multiple in number and the number of the first sub photo spacer is greater than the number of the second sub photo spacer and the number of the second sub photo spacer is greater than the number of the main photo spacer, such that the number of the main photo spacer of which the first distance is of a smallest value among the first, second, and third distances is smaller than the number of second sub photo spacer, which is in turn smaller than the number of the first sub photo spacer of which the second distance is of a greatest value among the first, second, and third distances.

6. The liquid crystal display device as claimed in claim 5, wherein the liquid crystal display panel further comprises a second accommodation section formed on the third surface, wherein the second depth of the second accommodation section is smaller than the first depth of the first accommodation section.

7. The liquid crystal display device as claimed in claim 5, wherein the first accommodation section and the second accommodation section are formed through half tone mask processing.

8. The liquid crystal display device as claimed in claim 5, wherein the first sub photo spacer comprises a first end mounted to the first surface and a second end opposite to the first end, the first end having a width that is greater than a width of the second end; the second sub photo spacer comprises a third end mounted to the first surface and a fourth end opposite to the third end, the third end having a width greater than a width of the fourth end; and the first accommodation section has a width that is smaller than the width of the first end and greater than the width of the second end and the second accommodation section has a width that is smaller than the width of the third end and greater than the width of the fourth end.

* * * * *